United States Patent
Khatri et al.

(10) Patent No.: US 10,628,583 B2
(45) Date of Patent: Apr. 21, 2020

(54) DETECTING A SPOOFED IMAGE IN AN INFORMATION HANDLING SYSTEM

(71) Applicant: DELL PRODUCTS, L.P., Round Rock, TX (US)

(72) Inventors: Mukund P. Khatri, Austin, TX (US); Alaric J. N. Silveira, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 193 days.

(21) Appl. No.: 15/664,144

(22) Filed: Jul. 31, 2017

(65) Prior Publication Data

US 2019/0034630 A1   Jan. 31, 2019

(51) Int. Cl.
*G06F 21/57* (2013.01)
*G06F 21/56* (2013.01)

(52) U.S. Cl.
CPC .......... *G06F 21/56* (2013.01); *G06F 21/572* (2013.01); *G06F 2221/034* (2013.01)

(58) Field of Classification Search
None
See application file for complete search history.

(56) References Cited

U.S. PATENT DOCUMENTS 8,315,991 B2   11/2012   Mandagere et al.
2018/0089438 A1*   3/2018   Oh .................. G06F 21/577

* cited by examiner

*Primary Examiner* — Brandon S Hoffman
(74) *Attorney, Agent, or Firm* — Isidore PLLC

(57) ABSTRACT

A method, information handling system (IHS) and a detection system for detecting a spoofed firmware image in an IHS. The method includes a processor triggering a controller to execute a diagnostic image for testing an image under test. At least one first test result is received from the controller executing the diagnostic image. The method further includes determining whether the first test result is a valid first test result. In response to determining that the first test result is not a valid first test result, the image under test is identified as a spoofed image that has failed testing. An error message is generated that identifies the image under test as being a spoofed image and the error message is stored to an error log.

20 Claims, 7 Drawing Sheets

DETECTING A SPOOFED IMAGE IN AN INFORMATION HANDLING SYSTEM

BACKGROUND

1. Technical Field

The present disclosure generally relates to information handling systems and in particular to security of firmware images in an information handling system.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems can include various components that have stored firmware images. For example, an information handling system may include processors, network switches, baseboard management controllers, input-output controllers, network interface devices and other components. Each of these components may utilize stored firmware images. Firmware is executable by the component and is usually specific to the component. For example, the firmware may include instructions that translate general purpose instructions from an operating system into component specific instructions for execution by hardware devices.

A fake or spoofed firmware image can be loaded directly onto an information handling system without relying on vendor provided firmware update methods and associated security checks. Because spoofed firmware images tend to mimic all of the correct behavior of authentic firmware images, spoofed firmware images are difficult to discover and remediate.

BRIEF SUMMARY

Disclosed are a method, an information handling system (IHS), and a detection system for detecting a spoofed firmware image in an IHS.

According to one embodiment, the method includes a processor triggering a controller to execute a diagnostic image to initiate testing of an image under test. At least one first test result is received from the controller executing the diagnostic image. The method further includes determining if the first test result is a valid first test result. In response to determining that the first test result is not a valid first test result, the image under test is identified as a spoofed image that has failed testing. An error message is generated that identifies the image under test as being a spoofed image and the error message is stored to an error log. The method further includes retrieving at least one trusted image corresponding to the spoofed image and transmitting the at least one trusted image to the controller. The controller is triggered to store the trusted image in place of the spoofed image.

According to another embodiment, the IHS includes a processor that is communicatively coupled to a controller and to a first memory device. The processor has firmware executing thereon for detecting a spoofed image. The firmware configures the processor to trigger the controller to execute a diagnostic image that initiates testing of an image under test. The processor receives at least one first test result from the controller executing the diagnostic image. The processor determines if the first test result is a valid first test result. In response to determining that the first test result is not a valid first test result, the image under test is identified as a spoofed image that has failed testing. The firmware further configures the processor to generate an error message that identifies the image under test as being a spoofed image and to store the error message to an error log. The firmware further configures the processor to retrieve at least one trusted image corresponding to the spoofed image and transmit the at least one trusted image to the controller. The controller is triggered to store the trusted image in place of the spoofed image.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
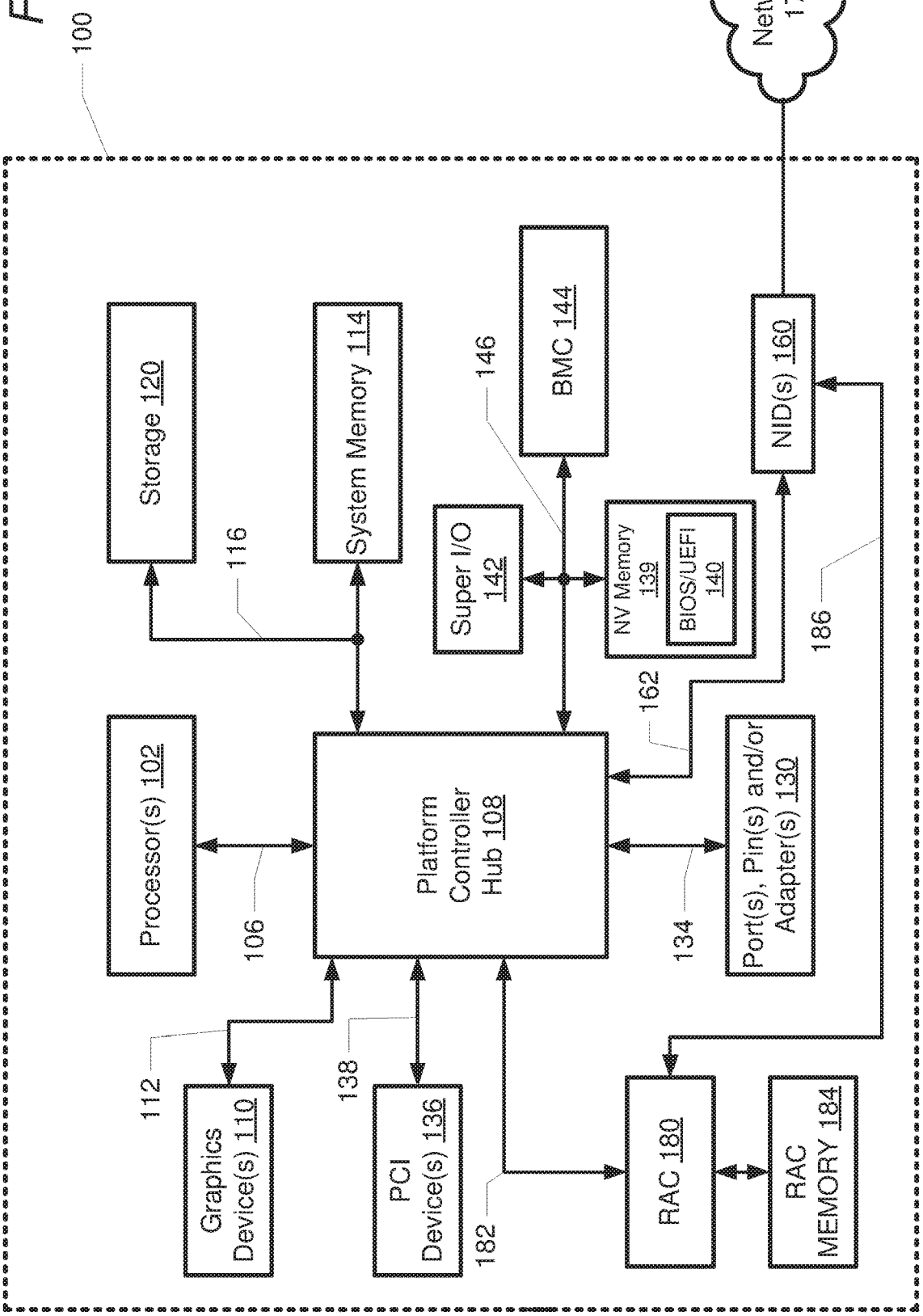
FIG. 1 illustrates one example of an IHS within which various aspects of the disclosure can be implemented, according to one or more embodiments.

The illustrative embodiments provide a method, an information handling system (IHS), and a detection system for detecting a spoofed firmware image in an IHS.

The method includes a processor triggering a controller to execute a diagnostic image for testing an image under test. At least one first test result is received from the controller executing the diagnostic image. The method further includes determining if the first test result is a valid first test result. In response to determining that the first test result is not a valid first test result, the image under test is identified as a spoofed image that has failed testing. An error message is generated that identifies the image under test as being a spoofed image and the error message is stored to an error log. The method further includes retrieving at least one trusted image corresponding to the spoofed image and transmitting the at least one trusted image to the controller. The controller is triggered to store the trusted image in place of the spoofed image In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, an example of an IHS 100 is shown. IHS 100 includes one or more processor(s) 102. In various embodiments, IHS 100 may be a single-processor system including one processor 102, or a multi-processor system including two or more processor(s) 102 (e.g., two, four, eight, or any other suitable number). Processor(s) 102 includes any processor capable of executing program instructions.

Processor(s) 102 are coupled to platform controller hub (PCH) or chipset 108 via front-side bus 106. PCH 108 may be configured to coordinate I/O traffic between processor(s) 102 and other components. For example, in this particular implementation, PCH 108 is coupled to various IHS components such as graphics device(s) 110 (e.g., one or more video cards or adaptors, etc.) via graphics bus 112 (e.g., an Accelerated Graphics Port or AGP bus, a Peripheral Component Interconnect (PCI) bus, etc.). PCH 108 is also coupled to system memory 114 via system bus 116. System memory 114 may be configured to store program instructions and/or data, accessible by processor(s) 102. In various embodiments, system memory 114 may be implemented using any suitable memory technology, such as static RAM (SRAM), synchronous dynamic RAM (SDRAM), nonvolatile/Flash-type memory, or any other type of memory.

PCH 108 is coupled by system bus 116 to storage device or storage 120 within which can be stored one or more software and/or firmware modules and/or data (not specifically shown). In one embodiment, storage 120 can be a hard drive or a solid state drive. The one or more software and/or firmware modules within storage 120 can be loaded into system memory 114 during operation of IHS 100.

PCH 108 is also coupled to one or more PCI devices 136 (e.g., modems, network cards, sound cards, video cards, shared memory etc.) via PCI bus 138. PCH 108 is further coupled to port(s), pin(s), and/or adapter(s) 130 over bus 134. Generally, PCH 108 may be configured to handle various I/O operations, and PCH 108 may provide interfaces such as, for instance, Universal Serial Bus (USB), audio, serial, parallel, Ethernet, and other interfaces, via port(s), pin(s), and/or adapter(s) 130 over bus 134. For example, PCH 108 may be configured to allow data to be exchanged between IHS 100 and other devices, such as other IHSs attached to a network. In various embodiments, PCH 108 may support communication via wired or wireless general data networks, such as any suitable type of Ethernet network, via telecommunications/telephony networks, such as analog voice networks or digital fiber communications networks, via storage area networks (SAN) such as Fiber Channel SANs, or via any other suitable type of network and/or protocol.

PCH 108 may also enable connection to one or more input devices, such as keyboards, keypads, touch screens, scanning devices, voice or optical recognition devices, or any other devices suitable for entering or retrieving data. Multiple I/O devices may be present in IHS 100. In some embodiments, I/O devices may be separate from IHS 100 and may interact with IHS 100 through a wired or wireless connection. PCH 108 is coupled to a non-volatile (NV) storage or memory device 139 via Low Pin Count (LPC) bus 146. NV memory device 139 stores a basic input output system/unified extensible firmware interface (BIOS/UEFI) 140. BIOS/UEFI 140 can contain one or more stored firmware images such as UEFI images. PCH 108 is also coupled to super I/O Controller 142 and baseboard management controller (BMC) 144 via LPC bus 146.

BIOS/UEFI 140 includes program instructions stored thereon typically as BIOS or UEFI images. Those instructions may be usable by processor(s) 102 to initialize and test other hardware components and/or to load an Operating System (OS) onto IHS 100. As such, (BIOS/UEFI) 140 may include a firmware interface that allows processor(s) 102 to load and execute certain firmware, as described in more detail below. In some cases, such firmware may include program code that is compatible with the Unified Extensible Firmware Interface (UEFI) specification, although other types of firmware may be used.

IHS 100 further includes BMC 144 that is in communication with NV memory device 139. NV memory device 139 can have program instructions stored thereon that are usable by processors(s) 102 to enable remote management of IHS 100. For example, BMC 144 may enable a remote user to discover, configure, and manage BMC 144, setup configuration options, resolve and administer hardware or software problems, etc. Additionally or alternatively, BMC 144 may include one or more BMC firmware volumes, each volume having one or more firmware files used by the UEFI firmware interface to initialize and test components of IHS 100. IHS 100 also includes a super I/O controller 142 that combines interfaces for a variety of lower bandwidth or low data rate devices. Those devices may include, for example, floppy disks, parallel ports, a keyboard and mouse and other devices.

In some cases, IHS 100 may be configured to access different types of computer-accessible media separate from system memory 114. Generally speaking, a computer-accessible memory device may include any tangible, non-transitory storage media or memory media such as electronic, magnetic, or optical media (e.g., magnetic disk, a hard drive, a CD/DVD-ROM, a Flash memory, etc.) coupled to IHS 100 via PCH 108. Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

IHS 100 further includes one or more network interface devices (NID(s)) 160 coupled to PCH 108 via PCI bus 162. NID(s) 160 enables IHS 100 to communicate and/or interface with other devices, services, and components that are located external to IHS 100. These devices, services, and components can interface with IHS 100 via an external network, such as example network 170, using one or more communication protocols. In one embodiment, a customer provisioned system/platform can comprise multiple devices located across a distributed network, and NID 160 enables IHS 100 to be connected to these other devices. Network 170 can be a local area network, wide area network, personal area network, and the like, and the connection to and/or between network 170 and IHS 100 can be wired or wireless or a combination thereof. For purposes of discussion, network 170 is indicated as a single collective component for simplicity. However, it is appreciated that network 170 can comprise one or more direct connections to other devices as well as a more complex set of interconnections as can exist within a wide area network, such as the Internet.

IHS 100 further includes a remote access controller (RAC) 180 coupled via PCI bus 182 to PCH 108. RAC 180 provides management functions that allow an administrator to deploy, monitor, manage, configure, update, troubleshoot and remediate IHS 100. RAC 180 is also coupled to RAC memory 184. In one embodiment, RAC memory 184 can be shared with processor(s) 102. RAC 180 is also communicatively coupled to NID(s) 160 via a sideband bus 186.

RAC 180 monitors and controls the operation of IHS 100 and other systems and devices communicatively coupled to IHS 100. RAC 180 can also perform configuration and remote controlling of other connected IHS s. Certain software and/or firmware modules stored in RAC memory 184 can be executed by RAC 180. Processor(s) 102 and RAC 180 include specific firmware that enables processor(s) 102 and RAC 180 to perform the various functions described herein.

A person of ordinary skill in the art will appreciate that IHS 100 is merely illustrative and is not intended to limit the scope of the disclosure described herein. In particular, any computer system and/or device may include any combination of hardware or software capable of performing certain operations described herein. For instance, although IHS 100 is illustrated following a first type architecture, various systems and methods described herein may be adapted to work with any other architecture having a different chipset and/or RAC configuration. In other implementations, one or more of the devices or components shown in FIG. 1 may be absent, or one or more other components may be added.

Accordingly, systems and methods described herein may be implemented or executed with other computer system configurations. In addition, the operations performed by the illustrated components may, in some embodiments, be performed by fewer components or distributed across additional components. Similarly, in other embodiments, the operations of some of the illustrated components may not be performed and/or other additional operations may be available.

Figure 2:
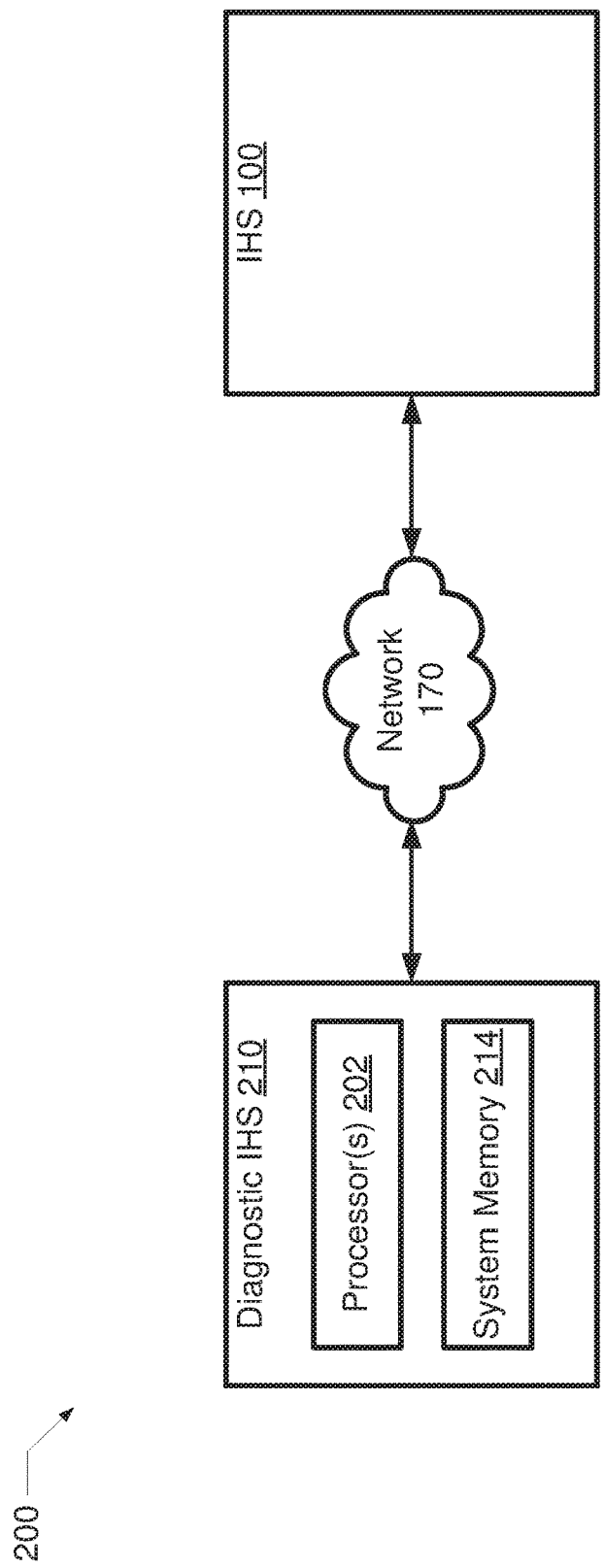
FIG. 2 illustrates an example networked computing system, in accordance with one embodiment.

In the description of each of the following figures, reference is also made to specific components illustrated within the preceding figures, with similar or the same components sharing a same reference number. With reference now to FIG. 2, one embodiment of a networked computing system 200 is shown. Networked computing system 200 includes a diagnostic IHS 210 that is communicatively coupled to an IHS under test, such as IHS 100, via network 170. In another embodiment, diagnostic IHS 210 can be communicatively coupled to IHS 100 via a direct connection. In one embodiment, diagnostic IHS 210 can have the same architecture and design features as IHS 100. Diagnostic IHS 210 includes processor(s) 202 and a system memory 214. Diagnostic IHS 210 can be used to test the security of firmware image within IHS 100.

Figure 3B:
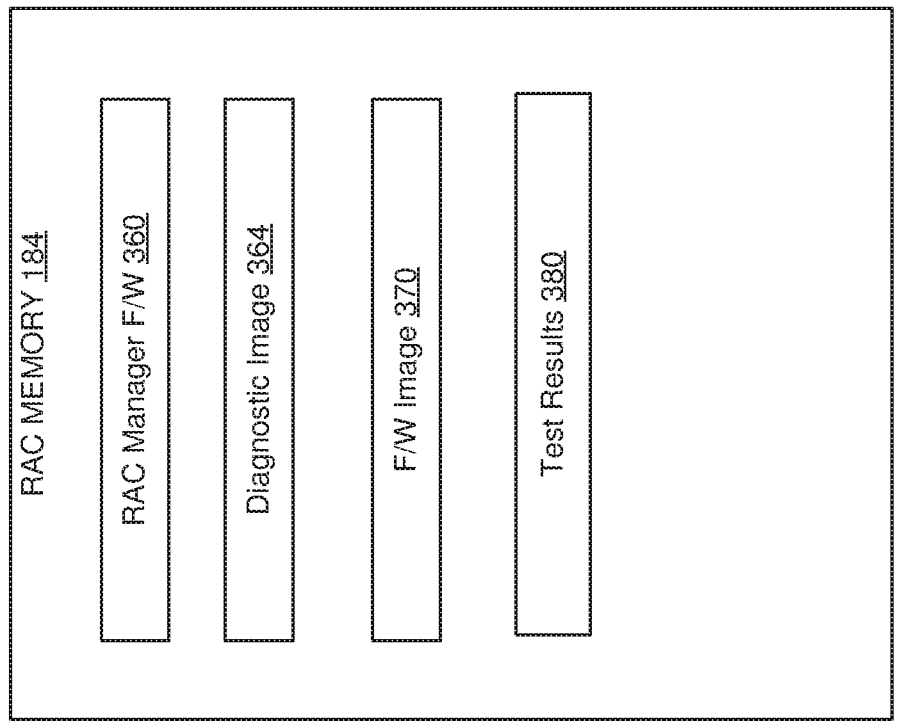
FIG. 3B illustrates example contents of a remote access controller memory device, in accordance with one embodiment.
Figure 3A:
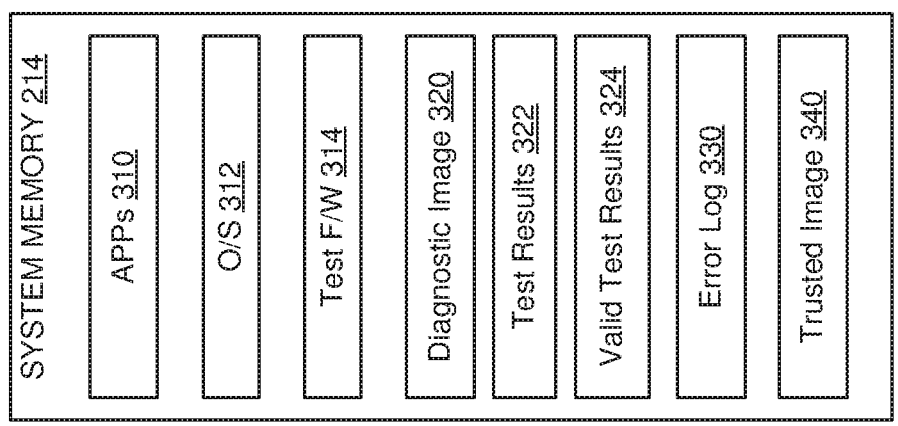
FIG. 3A illustrates example contents of a system memory in a diagnostic IHS, in accordance with one embodiment.

With reference now to FIG. 3A, one embodiment of example contents of system memory 214 of diagnostic IHS 210 is shown. System memory 214 includes data, software, and/or firmware modules, including application(s) 310, operating system (O/S) 312, and test firmware (F/W) 314. IHS 210 executes test F/W 314 to facilitate the detection of spoofed firmware images in IHS 100. Test F/W 314 performs the processes presented in the flowchart of FIGS. 5A-B. System memory 214 further includes diagnostic image 320, test results 322, valid test results 324, error log 330 and trusted image 340. Diagnostic image 320 is a set of diagnostic functions that are executed using a firmware image that is under test or being tested as an input. The diagnostic functions are a variety of mathematical functions that provide an output for a given input. An example of one such a function is the cryptographic hash function. Test results 322 are results returned from IHS 100 by the execution of a diagnostic image within IHS 100. In one embodiment, test results 322 are based on values and the order of sequence of calls returned by the diagnostic image.

Valid test results 324 are pre-determined values and order of sequence of calls that indicate that the stored firmware images being tested are authentic. During a provisioning process, a known controlled or 'golden' firmware image is subjected to a variety of sequences of function calls that are executed, and the results are recorded as valid test results 324. When the sequence of functions of diagnostic image 320 are executed against an image under test, the valid test results expected are those that were recorded against the golden image. Using a golden image, scripts are created where a sequence of functions is executed and the results recorded. With a set of scripts, a number of function sequences can be executed and the results recorded. A number of function sequences provide a variety of execution paths for the diagnostic image. Each script then becomes a particular test case to be executed with the diagnostic image. If the diagnostic image fails to execute or returns results that do not match the valid test results, the firmware image under test can be identified as a spoofed image. Error log 330 contains error messages generated when a spoofed image has been identified. Trusted image 340 is a known valid firmware image that can be used to replace a firmware image that has been identified as being spoofed. System memory 214 can also include other data, software, and/or firmware modules.

Turning to FIG. 3B, one embodiment of example contents of RAC memory 184 of IHS 100 is shown. RAC memory 184 includes RAC manager F/W 360 and diagnostic image 364. RAC manager F/W 360 executes on RAC 180 to control the operation of RAC 180. Diagnostic image 364 is received from IHS 210 and stored to RAC memory 184. RAC memory 184 further includes F/W image 370 and test results 380. F/W image 370 contains instructions for the operation of RAC 180 within IHS 100. F/W image 370 is the image under test or being tested by diagnostic image 364. Test results 380 are the results returned by RAC 180 executing diagnostic image 320 on F/W image 370. In one embodiment, test results 380 are based on the value returned by the diagnostic image 320, and the order of sequence of calls, and the information returned.

In one embodiment, test F/W 314, executing on processor 202, triggers RAC 180 to execute diagnostic image 364 for testing at least one image under test (e.g., image F/W image 370). The diagnostic image returns test results for a given input according to known mathematical functions. For example, the mathematical function could be to calculate the square root, square, or cube of a value, or could be a hash function or a multiplier (generating a product). At least one first test result (e.g., test results 380) is received from RAC 180 executing diagnostic image 364. The test results are the output of a mathematical calculation for the function. For example, the mathematical calculation for a given function could be to derive the square of the input as the output. Processor 202 determines if the first test result is a valid first test result. In response to determining that the first test result is not a valid first test result (e.g. test result 380 does not match valid test result 324, processor 202 identifies the image under test as a spoofed image that has failed testing. Processor 202 generates an error message that identifies the image under test as being a spoofed image and the error message is stored to error log 330.

FIGS. 4, 5A-B and 6 illustrate flowcharts of exemplary methods 400, 500 and 600 by which RAC 180 and processor 202 within the preceding figures perform different aspects of the processes that enable the one or more embodiments of the disclosure. Generally, method 400 represents a method by which a controller is triggered to execute a diagnostic image. Method 500 represents a method for detecting a spoofed firmware image in an IHS. Method 600 represents a method by which a controller replaces identified spoofed images with trusted images.

The description of methods 400, 500 and 600 is provided with general reference to the specific components illustrated within the preceding FIGS. 1-3B. Method 400 is described as being implemented via RAC 180 and particularly the execution of code provided by diagnostic image 320 within RAC 180. Method 500 is described as being implemented via processor 202 and particularly the execution of code provided by test F/W 314 within processor 202. Method 600 is described as being implemented via RAC 180 and particularly the execution of code provided by RAC manager F/W 360 within RAC 180. It is however appreciated that certain aspects of the described methods may be implemented via other processing devices and/or execution of other code.

Figure 4:
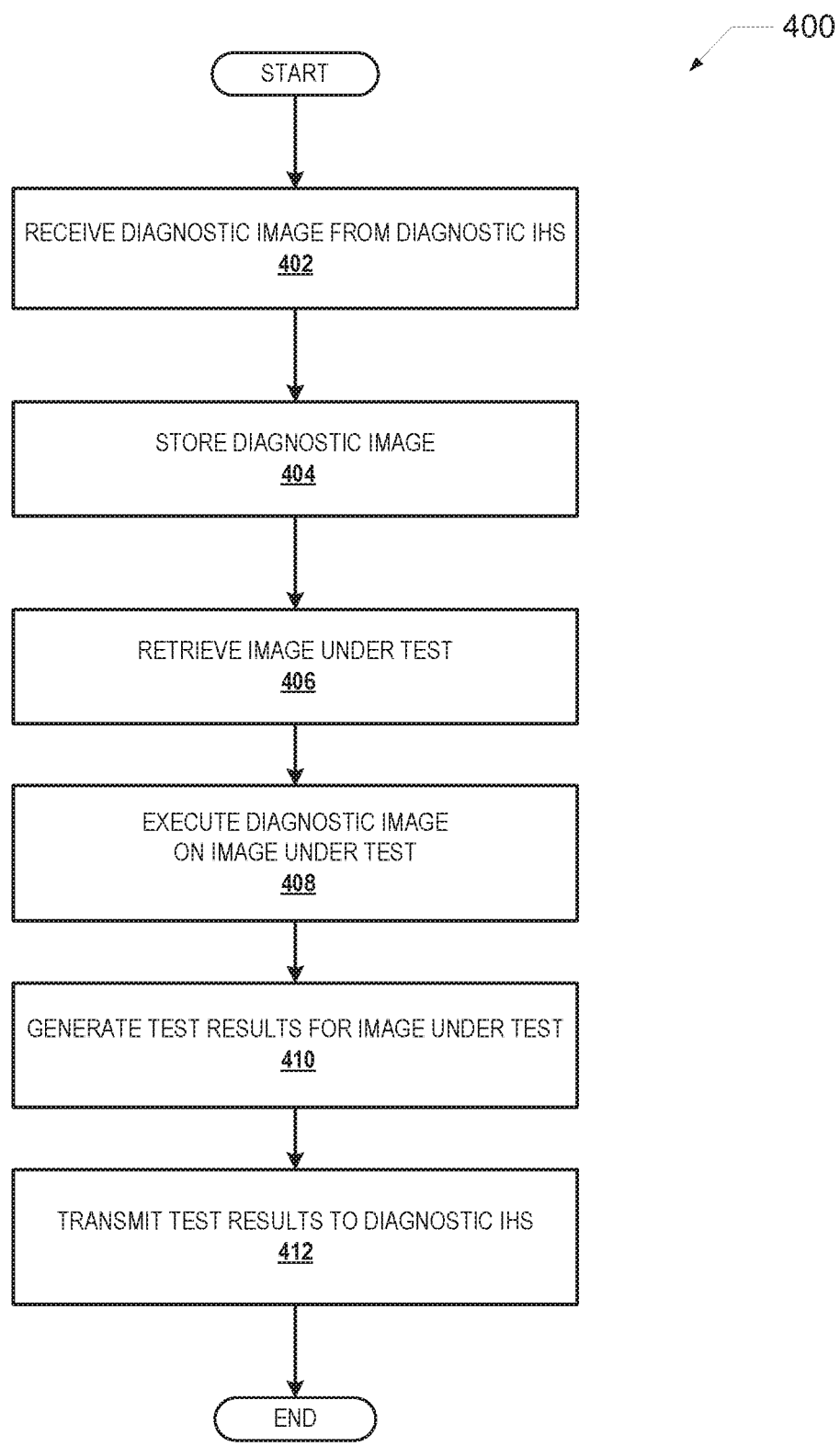
FIG. 4 is a flow chart illustrating one example of a method by which a controller, within the IHS being tested, executes a diagnostic image, according to one or more embodiments.

Referring to the flow chart of FIG. 4, method 400 begins at the start block and proceeds to block 402 where RAC 180 receives the diagnostic image from diagnostic IHS 210 via network 170 and sideband bus 186. In another embodiment, RAC 180 can receive the diagnostic image from diagnostic IHS 210 via a direct connection. RAC 180 stores diagnostic image 364 to RAC memory 184 (block 404). RAC 180 retrieves the F/W image 370 to be tested or that are under test from RAC memory 184 (block 406). RAC 180 runs or executes the diagnostic image 364 using the image under test as inputs (block 408). One image is tested at a time. RAC 180 generates test results 380 from the execution of the functions within diagnostic image 364 for the image under test (block 410). RAC 180 transmits the test results 380 to diagnostic IHS 210 via sideband bus 186 and network 170. Method 400 then ends. In another embodiment, multiple stored firmware images within RAC memory 184 can be tested or checked by diagnostic image 364.

Figure 5A:
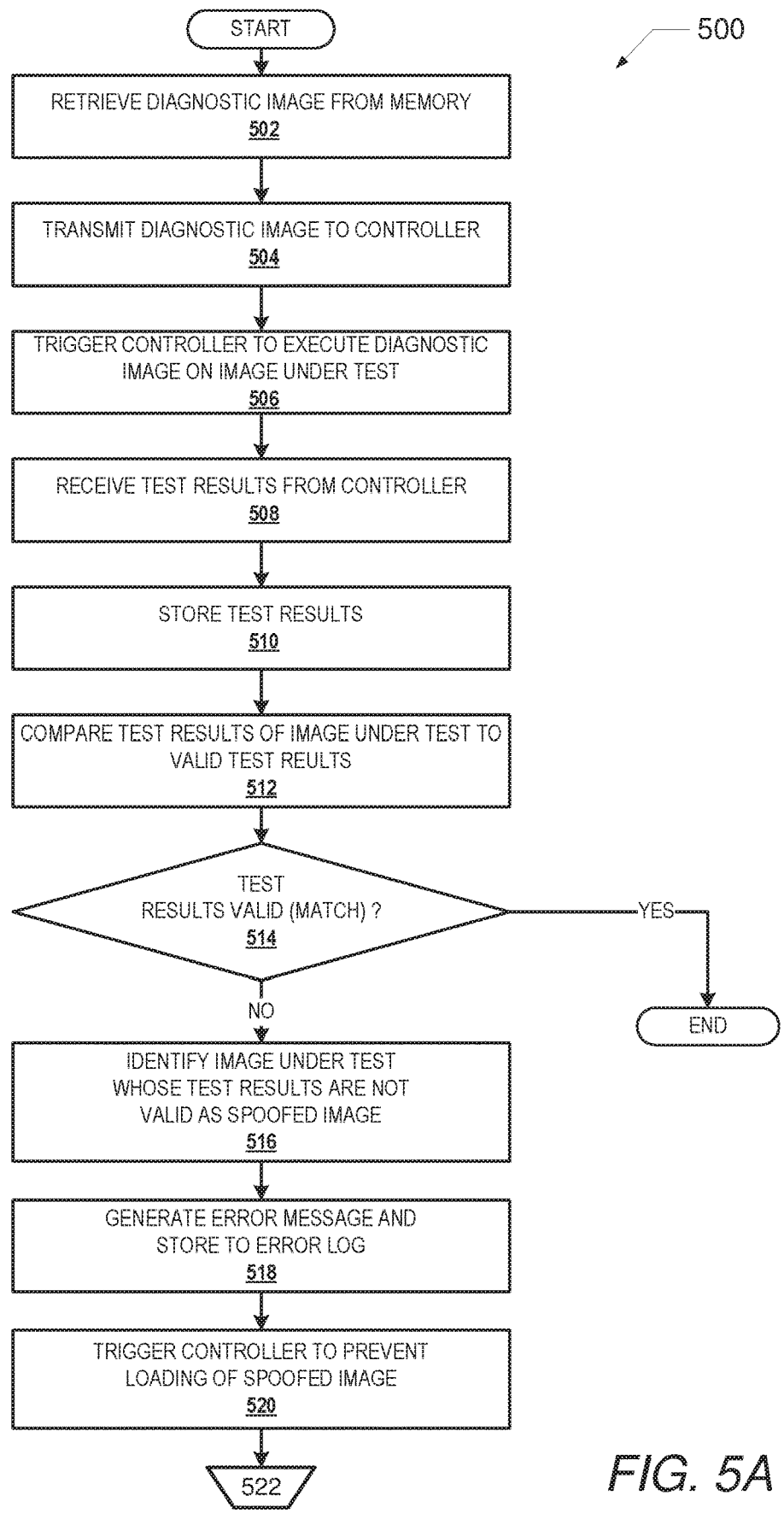
FIGS. 5A and 5B present a flow chart illustrating one example of a method by which the detection IHS detects a spoofed firmware image in a target IHS, according to one or more embodiments.

With reference to the flow chart of FIG. 5A, method 500 begins at the start block and proceeds to block 502 where processor 202 retrieves diagnostic image 320 from system memory 214. Processor 202 transmits the diagnostic image 320 to a controller, such as IHS 100, via network 170 (block 504) where the received diagnostic image is stored in RAC memory 184 as diagnostic image 364. In another embodiment, the diagnostic image 320 is pre-provisioned within IHS 100. Specifically, in this embodiment, the diagnostic image is embedded within the RAC 180. Processor 202 triggers RAC 180 to execute the diagnostic image (i.e. diagnostic image 364) on the image under test (e.g. F/W image 370) (block 506). In one embodiment, RAC 180 can be pre-programmed to respond to receiving the diagnostic image by executing the received diagnostic image. After RAC 180 executes the diagnostic image, processor 202 receives the test results from IHS 100 (block 508) and stores the test results 322 to system memory 214 (block 510). In one embodiment, for example, the test results can be the value returned from a hash function using the image under test as an input. Processor 202 compares the received test results 322 for the images under test to the valid test results 324 (block 512).

At decision block 514, processor 202 determines if the test results 322 for the image under test pass or are valid test results. If the test results 322 match or are the same as the valid test results 324 for the image under test, the image under test is valid or passes testing. If the test results 322 do not match the valid test results 324 for the image under test, the image under test is not valid or fails testing. In response to the test results 322 matching the valid test results 324 for the image under test, method 500 terminates. In response to the test results 322 not matching the valid test results 324 for the image under test, processor 202 identifies the image under test that is not valid or has failed testing as a spoofed image (block 516). Processor 202 generates an error message and stores the error message to error log 330 (block 518). The error message includes the identity of the image under test that has been identified as a spoofed image. Processor 202 triggers the controller to prevent loading of the spoofed image (block 520).

Figure 5B:
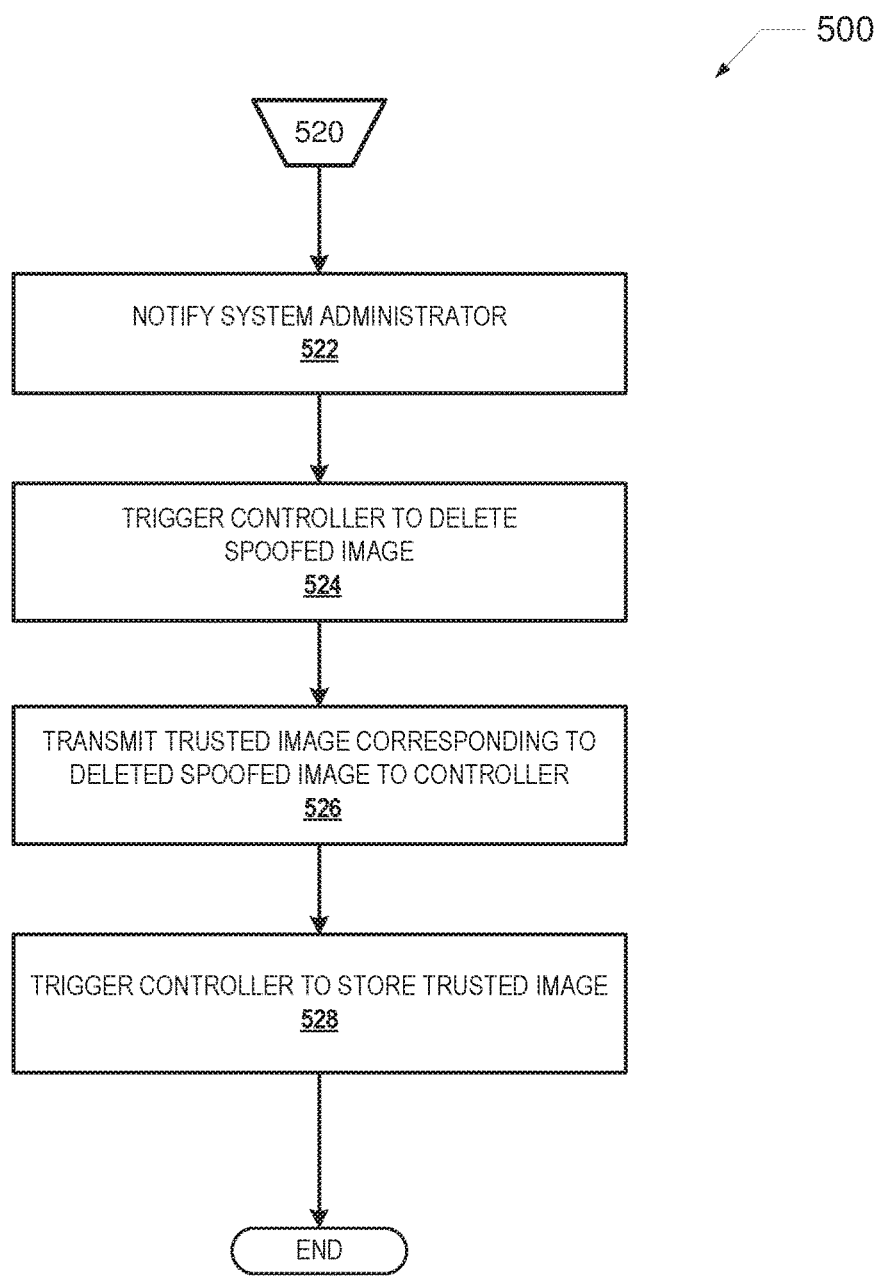

Turning to FIG. 5B, processor 202 generates a notification (e.g., visual message or audible alert) that is sent to an output device for notifying a system administrator that the F/W image 370 is a spoofed image (block 522). Processor 202 triggers RAC 180 to delete the spoofed image (block 524). Processor 202 transmits to IHS 100 trusted image 340 corresponding to the deleted spoofed image (block 526). Processor 202 triggers RAC 180 to store the received trusted image 340 to RAC memory 184 in place of the deleted F/W image 370 (block 528). In one embodiment, RAC 180 is pre-programmed to respond to receiving the trusted image by replacing the spoofed image with the received trusted image 340. Method 500 concludes at the end block.

Figure 6:
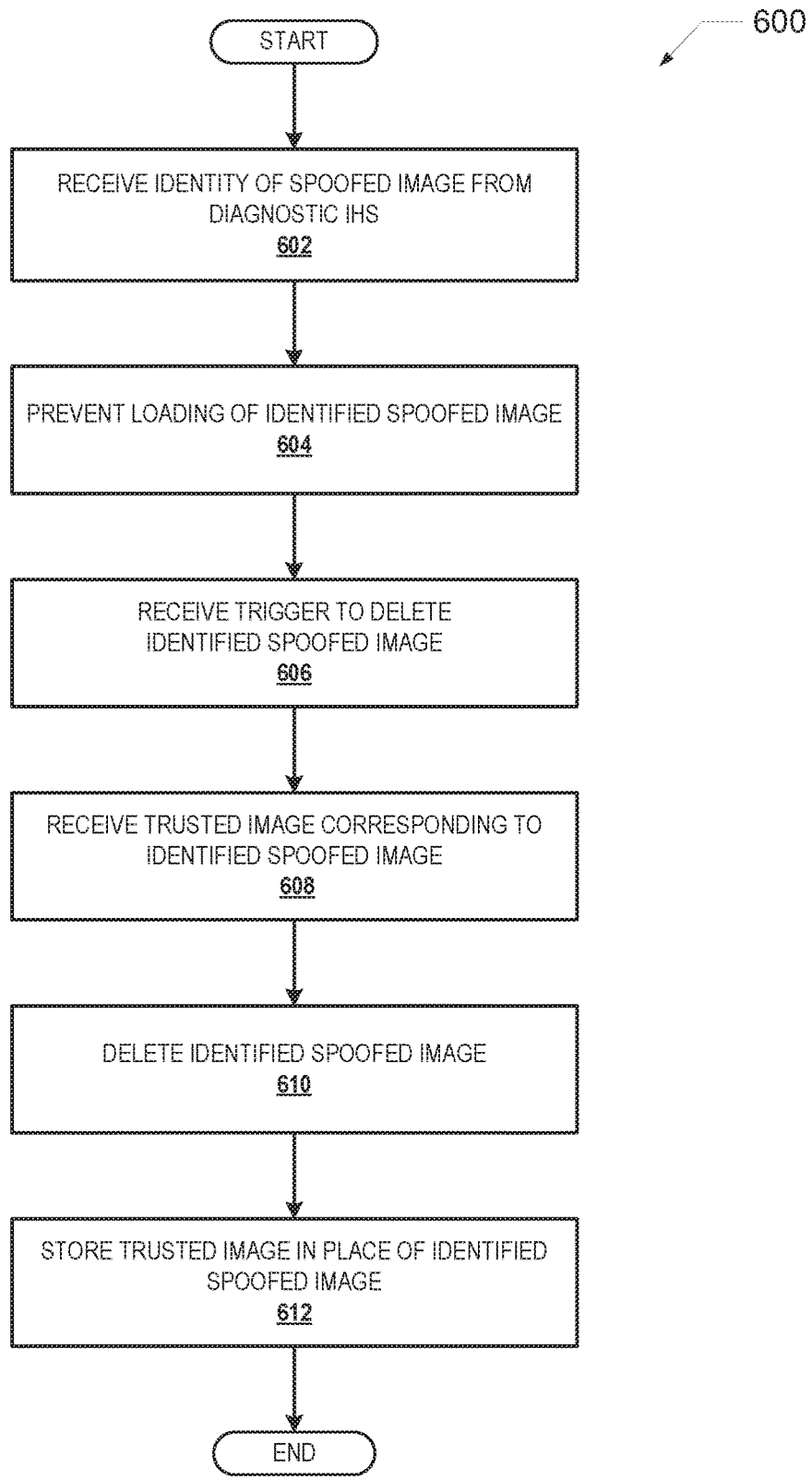
FIG. 6 is a flow chart illustrating one example of a method by which a controller, within the IHS being tested, replaces identified spoofed images with trusted images.

Referring to the flow chart of FIG. 6, method 600 begins at the start block and proceeds to block 602 where RAC 180 receives the identity of the spoofed image from diagnostic IHS 210 via network 170 and sideband bus 186. In another embodiment, RAC 180 can receive the identity of the spoofed image from diagnostic IHS 210 via a direct connection. RAC 180 prevents loading of the spoofed image (block 604). RAC 180 receives a trigger from diagnostic IHS 210 to delete the identified spoofed image from RAC memory 184 (block 606). RAC 180 receives trusted image 340 from diagnostic IHS 210 (block 608). The received trusted image corresponds to the identified spoofed image. RAC 180 deletes the identified spoofed image (block 610) and stores the trusted image 340 in place of the identified spoofed image (block 612). Method 600 then ends.

In the above described flow chart, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A computer implemented method for detecting a spoofed image in an information handling system (IHS), the method comprising:
    triggering, by a processor of a diagnostic IHS, a controller to execute a diagnostic image for testing an image under test, the controller being a component of the IHS and comprising a memory having the image under test, the diagnostic image using the image under test as inputs and returning test results for a given input according to mathematical functions, the image under test being a firmware image;
    receiving at least one first test result from the controller executing the diagnostic image on the image under test, the test results being values and an order of sequence calls returned by the diagnostic image;
    determining whether the first test result is a valid first test result, the valid first test result comprising pre-determined values and based on a pre-determined order of sequence calls, and indicating that the image under test is authentic; and
    in response to determining that the first test result is not a valid first test result:
        identifying the image under test as a spoofed image that has failed testing; and
        triggering the controller to prevent loading of the spoofed image that has failed testing.

2. The method of claim 1, further comprising:
    generating an error message that identifies the image under test as being a spoofed image and storing the error message to an error log.

3. The method of claim 1, wherein determining whether the first test result is a valid first test result further comprises:
    comparing the first test result to a pre-determined valid first test result, the pre-determined valid first test result being pre-determined values and order of sequence of calls that indicate that the stored image under test is authentic; and
    determining whether the first test result matches the pre-determined valid first test result.

4. The method of claim 1, further comprising:
    notifying a system administrator that the image under test is a spoofed image that has failed testing.

5. The method of claim 1, wherein triggering the controller to execute the diagnostic image for testing the image under test further comprises the controller:
    retrieving, from a second memory device, the image under test;
    executing the diagnostic image;
    generating the at least one first test result; and
    transmitting the at least one first test result to the processor.

6. The method of claim 1, further comprising:
    in response to identifying the image under test as a spoofed image, triggering the controller to delete the spoofed image that has failed testing.

7. The method of claim 1, further comprising:
    in response to identifying the image under test as a spoofed image:

retrieving a trusted image corresponding to the spoofed image;

transmitting the trusted image to the controller; and triggering the controller to store the trusted image in place of the spoofed image which is deleted.

8. An information handling system (IHS) comprising:

a first memory device having firmware stored thereon; and a processor communicatively coupled to a controller and the first memory device, the processor having the firmware executing thereon, wherein the firmware configures the processor to:

trigger the controller to execute a diagnostic image for testing an image under test, the controller comprising a second memory device having the image under test, the diagnostic image using the image under test as inputs and returning test results for a given input according to mathematical functions, the image under test being a firmware image;

receive at least one first test result from the controller executing the diagnostic image on the image under test, the test results being values and an order of sequence calls returned by the diagnostic image;

determine whether the first test result is a valid first test result, the valid first test result comprising pre-determined values and based on a pre-determined order of sequence calls, and indicating that the image under test is authentic; and in response to determining that the first test result is not a valid first test result:

identify the image under test as a spoofed image that has failed testing; and trigger the controller to prevent loading of the spoofed image that has failed testing.

9. The information handling system of claim 8, wherein the firmware further configures the processor to:

generate an error message that identifies the image under test as being a spoofed image and store the error message to an error log.

10. The information handling system of claim 8, wherein determining whether the first test result is a valid first test result comprises the firmware further configuring the processor to:

compare the first test result to a pre-determined valid first test result, the pre-determined valid first test result being pre-determined values and order of sequence of calls that indicate that the stored image under test is authentic; and determine whether the first test result matches the pre-determined valid first test result.

11. The information handling system of claim 8, wherein the firmware further configures the processor to:

notify a system administrator that the image under test is a spoofed image that has failed testing.

12. The information handling system of claim 8, wherein the firmware configuring the processor to trigger the controller to execute the diagnostic image for testing the image under test further triggers the controller to:

retrieve, from the second memory device, the image under test;

execute the diagnostic image;

generate the at least one first test result; and transmit the at least one first test result to the processor.

13. The information handling system of claim 8, wherein the firmware further configures the processor to:

in response to identifying the image under test as a spoofed image, trigger the controller to delete the spoofed image that has failed testing.

14. The information handling system of claim 13, wherein the firmware further configures the processor to:

in response to identifying the image under test as a spoofed image:

retrieve a trusted image corresponding to the spoofed image;

transmit the trusted image to the controller; and trigger the controller to store the trusted image in place of the spoofed image, which is deleted.

15. A detection system for detecting a spoofed image in an information handling system (IHS), the detection system comprising:

a first memory device having firmware stored thereon; and a processor communicatively coupled to a controller and the first memory device, the processor having the firmware executing thereon, wherein the firmware configures the processor to:

trigger the controller to execute a diagnostic image for testing an image under test, the controller comprising a second memory device having the image under test, the diagnostic image using the image under test as inputs and returning test results for a given input according to mathematical functions, the image under test being a firmware image;

receive at least one first test result from the controller executing the diagnostic image on the image under test, the test results being values and an order of sequence calls returned by the diagnostic image;

determine whether the first test result is a valid first test result, the valid first test result comprising pre-determined values and based on a pre-determined order of sequence calls, and indicating that the image under test is authentic; and in response to determining that the first test result is not a valid first test result:

identify the image under test as a spoofed image that has failed testing; and trigger the controller to prevent loading of the spoofed image that has failed testing.

16. The detection system of claim 15, wherein the firmware further configures the processor to:

generate an error message that identifies the image under test as being a spoofed image and store the error message to an error log.

17. The detection system of claim 15, wherein determining whether the first test result is a valid first test result comprises the firmware further configuring the processor to:

compare the first test result to a pre-determined valid first test result, the pre-determined valid first test result being pre-determined values and order of sequence of calls that indicate that the stored image under test is authentic; and determine whether the first test result matches the pre-determined valid first test result.

18. The detection system of claim 15, wherein the firmware further configures the processor to:

notify a system administrator that the image under test is a spoofed image that has failed testing.

19. The detection system of claim 15, wherein the firmware configuring the processor to trigger the controller to execute the diagnostic image for testing the at least one image under test further triggers the controller to:

retrieve, from the second memory device, the image under test;
execute the diagnostic image;
generate the at least one first test result; and
transmit the at least one first test result to the processor.

20. The detection system of claim 15, wherein the firmware further configures the processor to:
in response to identifying the image under test as a spoofed image:
trigger the controller to delete the spoofed image that has failed testing;
retrieve a trusted image corresponding to the spoofed image;
transmit the trusted image to the controller; and
trigger the controller to store the trusted image in place of the spoofed image, which is deleted.

* * * * *